May 30, 1950

G. W. DAVIS 2,509,909

CONDUCTIVE DEVICE

Filed Dec. 31, 1946

INVENTOR
G. W. DAVIS
BY [signature]
ATTORNEY

Patented May 30, 1950 2,509,909

UNITED STATES PATENT OFFICE 2,509,909

CONDUCTIVE DEVICE

Gustoff W. Davis, Madison, N. J., assignor to Bell Telephone Laboratories, Incorporated, New York, N. Y., a corporation of New York Application December 31, 1946, Serial No. 719,532

4 Claims. (Cl. 201—63)

This invention relates to non-metallic electrical conductors and more particularly to means and methods of making electrical connections thereto.

In the manufacture of some types of non-metallic electrical conductors it has been the practice heretofore to secure connecting leads thereto by applying an electrode comprising an adherent metallic film to a portion of the conductor and soldering a lead directly to the film. For example, such a technique has been employed in making connection to a disc-type high temperature coefficient of resistance device known as a thermistor. The adherent film is usually made by spreading a heat curable metallic paste, e. g. silver paste, on a disc face and heating to change the paste to an adherent film electrode, substantially of metal. The connecting lead may then be attached to the film by soldering with a relatively low melting point solder which limits the use of the device to temperatures below such a melting point.

Although such construction is satisfactory for many purposes, it has been found that for some applications, particularly for use at relatively high temperatures, this connection is not sufficiently rugged mechanically when a high temperature solder is used. This difficulty is apparently due to the dissolving of some of the film in the high temperature solder.

An object of this invention is to make a mechanically rugged electrical connection to a non-metallic conductor.

A further object of the invention is to provide means whereby a connection may be secured to the electrode of a non-metallic conductor by high temperature soldering, brazing or welding.

One feature of this invention resides in securing an electrode comprising a thin sheet or plate of metal to a surface of a non-metallic conductor and securing a connecting lead to the outer surface of the electrode.

Another feature involves the attaching of the connecting lead to the electrode by means capable of maintaining its mechanical strength at relatively high temperatures.

Other objects and features of this invention will be more fully and clearly understood from the following detailed description of exemplary embodiments thereof, taken in connection with the accompanying drawings in which.

Figure 1:
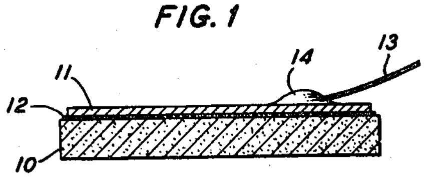
Fig. 1 is a sectional view of a disc type resistor with an electrical connection illustrative of this invention.

The invention is particularly described as applied to a disc thermistor made of a non-metallic material such as the sintered combined oxides of manganese and nickel. As shown in Fig. 1, the thermistor disc 10 has a metal plate or electrode 11 secured to one surface by a film or layer of metallic material 12. This layer 12 may be of a heat cured metallic paste or a metal or alloy having a somewhat lower melting point than the plate 11. The lead wire 13 may be secured to the outer face of metal plate 11 by solder 14 or by brazing or welding.

Figure 2:
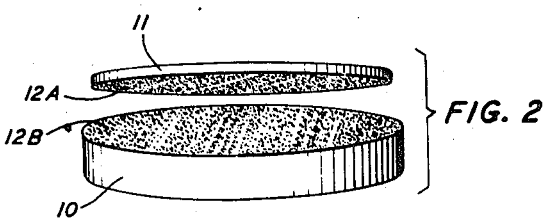
Fig. 2 is a perspective view of a metallic plate and a non-metallic resistor having adjacent surfaces coated with a material for securing the plates together.

If the layer or film 12 is of heat cured metallic paste, it may be made by applying a layer of paste 12A and 12B, respectively to the intended mating surfaces of disc 10 and plate 11 (see Fig. 2). The surfaces are then placed together and heat applied to cause the mating surfaces to adhere.

If plate 11 is of silver, the paste may be made of flake silver, a small amount of powdered glass, a temporary binder such as a polymerized ester of acrylic acid, and a suitable volatile solvent such as a glyco monoacetate. Such a paste may be cured at about 600° C. or higher. Other materials than silver may be used for both the plate and the paste and other fluxing, temporary binding and solvent materials may be employed depending upon circumstances.

If a metal or alloy is used for the layers 12, it may be melted and applied to the mating surfaces the same as the paste layers 12A and 12B and the parts secured together by heating. The metal or alloy may also be in the form of a disc placed between the disc 10 and plate 11 and then melted sufficiently to secure the parts together.

Figure 3:
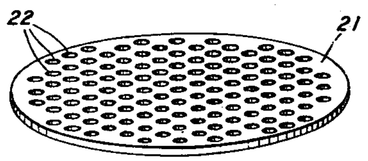
Fig. 3 is an alternative form of perforated metallic plate.

In place of the plate 11, a perforated plate 21, as shown in Fig. 3, may be employed. The perforations 22 in plate 21 allow the volatile ingredients of a metallic paste to escape more readily. Some of the material of layer 12 may also enter the perforations and when solidified provide additional strength to the bond.

The plates 11 and 21 which have been shown exaggerated as to thickness in the drawings, may be made very thin, for example of the order of two or three mils thickness. Such a thin plate adds little to the weight or size of the device, but in allowing the use of a rugged high temperature connection thereto, adds greatly to the versatility of the unit.

Although this invention has been disclosed by way of exemplary embodiments, it is intended that it be not limited thereby, but by the scope of the appended claims only.

What is claimed is:

1. The method of making electrical connection to a non-metallic conductive body that comprises spreading a heat curable metallic paste on a portion of the body surface and on a mating surface of a thin metal plate, joining the coated surfaces by the application of heat, and securing a connecting member to an outer surface of the metal plate.

2. The method of making electrical connection to the face of a non-metallic conductor disc which comprises applying a thin layer of heat curable metallic paste to a face of the disc and to a mating surface of a thin metallic disc, joining the coated surfaces by the application of heat, and then securing a connecting member to the outer surface of the metallic disc.

3. Means for making electrical connection to a conductive disc of sintered combined metallic oxides, that comprises a thin plate of silver secured to one face of the conductive disc by an adherent metallic layer of heat cured silver paste, and a conductive lead soldered to the exterior of said silver plate.

4. Means for making electrical connection to a non-metallic conductor that comprises a thin metal plate heat bonded to a surface of the conductor, and a connecting lead secured to the plate by a high temperature bond.

GUSTOFF W. DAVIS.

REFERENCES CITED

The following references are of record in the file of this patent:

UNITED STATES PATENTS

| Number | Name | Date |
|---|---|---|
| 1,418,633 | Egly | June 6, 1922 |
| 2,129,947 | Lazarus | Sept. 13, 1938 |
| 2,379,635 | Hastings | July 3, 1945 |

FOREIGN PATENTS

| Number | Country | Date |
|---|---|---|
| 226,531 | Great Britain | Apr. 16, 1925 |